Jan. 28, 1964    J. E. WALDO    3,119,413
FLUID TIMING VALVE
Filed Oct. 26, 1961    2 Sheets-Sheet 1
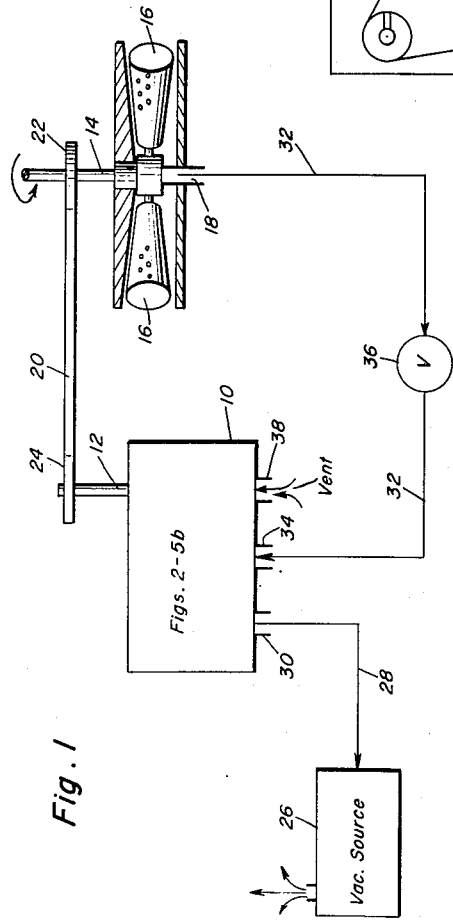
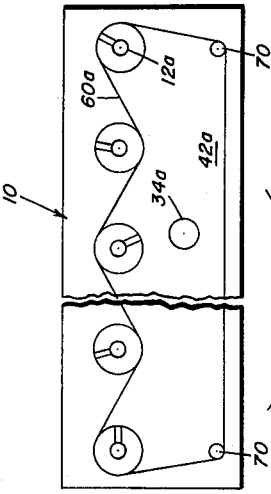
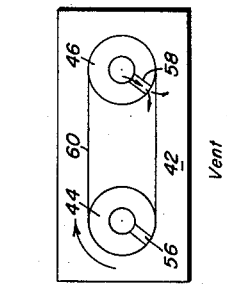
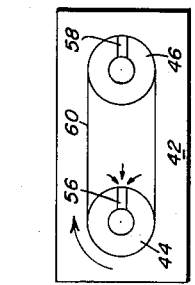
INVENTOR
John E. Waldo
BY Joseph A. Genovese &
Max L. Libman
ATTORNEYS Jan. 28, 1964

J. E. WALDO 3,119,413

FLUID TIMING VALVE

Filed Oct. 26, 1961

INVENTOR
John E. Waldo

BY Joseph A. Genovese & Max L. Libman

ATTORNEYS

United States Patent Office 3,119,413
Patented Jan. 28, 1964

3,119,413
FLUID TIMING VALVE
John E. Waldo, Silver Spring, Md., assignor to Rabinow Engineering Co., Inc., Takoma Park, Md.
Filed Oct. 26, 1961, Ser. No. 147,874
4 Claims. (Cl. 137—624.15)

This invention relates to fluid control systems and particularly to synchronizing fluid control with the movement of a part, for instance a shaft, crank, slide, etc.

Fluid control systems are very well known and in fact, fluid control of one type or another is required in all machines, equipment, apparatus, etc., which use fluid either as a principle or secondary power source. Ordinary valves which are timed by chains, linkages, electric circuits, etc., are generally used in these machines.

An object of my invention is to provide a new type of synchronizing fluid control system where control over the fluid is synchronized with the movement of the part involved.

An important feature of my invention is a unique valve having a chamber which is connected with a fluid source. Although my system may be used with liquid or gaseous fluid, and the gaseous fluid may be under pressure or may be a vacuum source, for simplicity the described embodiment of my invention is in terms of a vacuum system. Thus, the fluid chamber is a vacuum chamber and it has a pair of rotary members. One of the members is driven with the synchronized part, and the other member in the vacuum chamber is slaved to rotate therewith. I prefer to use a flexible belt to drivingly connect the two rotary members in the chamber so that the belt may function as a valve element for a pair of ports, there being one port in each of the rotary members. By connecting one rotary member with a vacuum source and the other rotary member port with atmosphere, the chamber is alternatively exposed to the vacuum source and vented as the rotary members operate and the belt successively covers and uncovers the ports. Accordingly, the chamber itself is alternately exposed to the vacuum source and atmosphere, and the pneumatic device to be controlled may be communicated with the chamber. Alternatively, the device to be controlled can just as easily be connected with the ported rotary member and the vacuum source continually communicated with the chamber.

Another object of my invention is to provide a synchronizing valve assembly which includes rotary members, ported as described above, whereby upon rotation of the members a source of positive pressure or suction is intermittently connected and disconnected with the valve chamber in time with the rotation of one of the members. If that rotation is slaved to or otherwise driven at a speed corresponding to the speed of an external part, (as herein) the fluid control is synchronized with the movement of the external part.

A feature of a system employing a valve assembly as aforesaid, is that the timing may be easily adjusted by rotating the chamber about the axis of the member which is driven at a speed corresponding to the synchronized part.

Another object of the invention is to provide a synchronizing fluid control for the motion of a mechanical part where the system is extremely simple and very reliable in operation.

Other objects and features of importance will become apparent in following the description of the illustrated form of the invention.

FIGURE 1 is a schematic view showing my system applied to a sheet-feeder having a rotary part where it is important to synchronize the valving of the pneumatic system with the rotation of the part.

FIGURE 5 is a diagrammatic view showing the action of the valve mechanism.

FIGURE 5a is a diagrammatic view similar to FIGURE 5.

FIGURE 5b is a diagrammatic view showing the timing adjustment of the valve mechanism.

FIGURE 6 is a diagrammatic view showing a modification of the valve mechanism.

Figure 2:
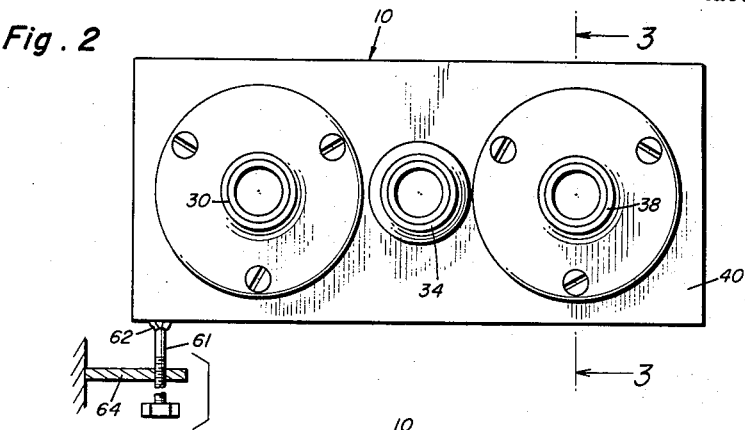
FIGURE 2 is an elevational view of the valve mechanism in FIGURE 1.

FIGURE 1 shows valve mechanism 10 having a shaft 12 which is rotated in synchronism with a mechanical part 14. The part 14 is a shaft operated by a power source (not shown) to rotate sheet pick-up heads 16. The heads 16 constitute a part of a pneumatic sheet pick up device and feeder such as disclosed in the Rabinow et al. application Serial No. 99,840, filed on March 31, 1961 and entitled Sheet Stacker of Feeder. The sheet feeder shown in FIGURE 1 is given as only one example of many possible devices with which the system of FIGURE 1 may be used. To the extent that the feeder is pertinent here, it has a movable (rotary) part 14 and a pneumatic passageway 18 where the fluid under negative pressure (vacuum) should or must be timed with the rotation of part 14.

Valve assembly 10 (details described later) is operated synchronously with the movement of part 14, for instance by a timing belt 20 engaged with timing belt pulleys 22 and 24 secured respectively to shafts 14 and 12. Vacuum source 26 is connected by conduit 28 with a vacuum fitting 30 of valve assembly 20. The controlled vacuum line 32 is connected with fitting 34 of valve assembly 10 and with the passageway 18. A manual control valve 36 (optional) is interposed in line 32. Vent fitting 38 opens to the atmosphere and is the only other fitting of mechanism 10.

Figure 3:
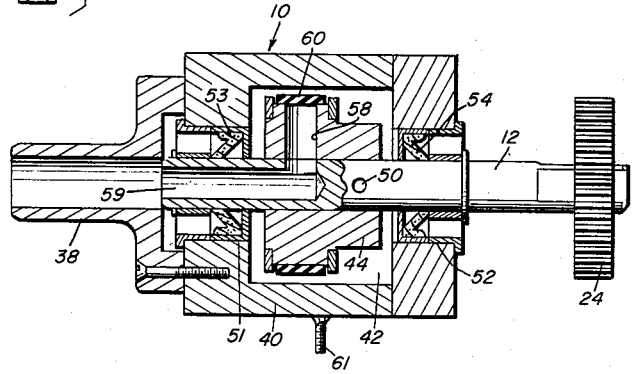
FIGURE 3 is a sectional view taken on line 3—3 of FIGURE 2.
Figure 4:
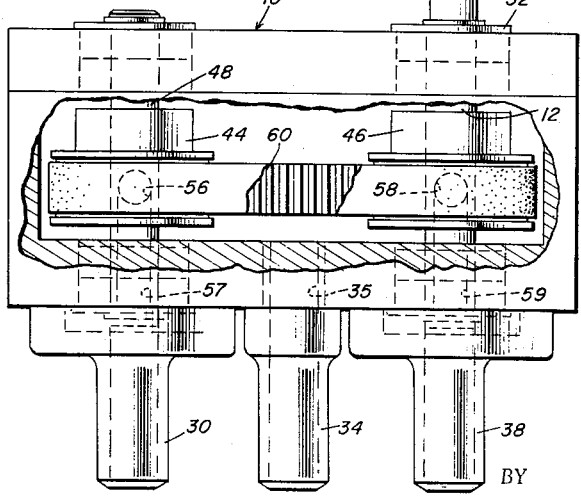
FIGURE 4 is a top view of the valve mechanism, parts broken away to shown otherwise obscured details.

Attention is now directed to FIGURES 2-5b. The valve mechanism 10 is illustrated in detail in these figures, and it includes a casing 40 defining a chamber 42 having two rotary members 44 and 46 disposed therein. Member 44 is secured to a spindle 48, and member 46 is attached to shaft 12, for instance by pin 50, (FIGURE 3). Spindle 48 and shaft 12 are similarly mounted for rotation. As shown in FIGURE 3, bearings 51 and 52 are equipped with air seals 53 and 54 and the bearings are secured in aligned openings in opposite walls of the casing 40. The previously mentioned fittings 30 and 38 are bolted or otherwise secured to the casing 40 and they are aligned with the axes of the spindle 48 and shaft 12 respectively.

Members 44 and 46 are flanged pulleys having ports 56 and 58, respectively, which open through the belt supporting surfaces thereof. An elongate, endless flexible element, for example a belt 60 is engaged with the two rotary members 44 and 46 requiring them to rotate in unison. The belt acts as a valve element for the ports 56 and 58 during rotation of members 44 and 46.

The operation of the valve assembly is more easily understood by reference to FIGURES 5 and 5a. The shaft 12 is the driver and therefore member 46 drives member 44 by means of a conventional timing belt 60. When the relative position of members 44 and 46 is as shown in FIGURE 5, the chamber 42 is registered with port 56 and hence it is registered with the axial passageway 57 of spindle 48. As a consequence, vacuum source 26 becomes communicated with chamber 42 by way of passageway 57 and the open port 56. Since the chamber 42 is under the suction of vacuum source 26 at this time, vacuum is applied to heads 16 by way of line 32, valve 36, and the passageway 35 extending through fitting 34. As shown in FIGURE 5, the port 58 is closed by the valve element (belt 60) at this time.

As the members 44 and 46 continue to rotate in the direction of the arrow, port 56 becomes closed by a part of belt 60 thereby cutting off the vacuum source 26. As port 56 is closing, port 58 opens as shown in FIGURE 5a. The opening of port 58 communicates chamber 42 with the atmosphere by way of port 58, and passageway 59 which registers with port 58 and which is axially formed in shaft 12 in registry with the fitting 38. Thus, chamber 42 becomes vented thereby discontinuing the vacuum to heads 16. As the members 44 and 46 continue to rotate the same cycle is repeated. Accordingly, rotation of shaft 14 is accompanied by synchronized control of vacuum at passageway 18 of the sheet pickoff and feeder.

One of the advantages of a system such as mine is the ease with which the timing of the pneumatic phasing may be adjusted. I have shown a screw 61 connected by swivel 62 with a part of the casing 40 and threaded through an opening in a fixed support 64. By adjusting the screw 61 the entire casing 40 is turned about the axis of shaft 12. This displaces the spindle 48 and its member 44 with respect to shaft 12 and member 46. Thus, the ports 56 and 58 are opened and closed in a slightly adjusted timed relationship with the rotation of shaft 12 thereby adjusting the timing of the valve assembly.

FIGURE 6 is a diagrammatic representation of valve assembly 10a. It differs from valve assembly 10 by having more than two ported members and spindles similar to spindle 48. One spindle, for instance, spindle 12a is used as a drive spindle to drive the belt 60a. The chamber 42a can be either a pressure or vacuum chamber and is connected with a suitable external source of pressure or vacuum by way of fitting 34a. Then, all of the ported members on all of the spindles may be used as separate distribution devices for vacuum or pressure to external devices with all of them timed by the belt 60a which is entrained thereover and around idlers 70 in the chamber. The timing of the various members may be adjusted by simply turning them with respect to each other so that their ports are opened and closed by belt 60a at different angular positions with respect to each other.

It is understood that various changes, modifications, alternations, and rearrangements may be made without departing from the protection of the following claims.

For example, I have shown all of the ported members of the same diameter. These may be varied, i.e. one larger than the other to have a different phasing. Further, one or more of the members can have more than one port to double, triple, etc., the valving per cycle. This is particularly useful for a mixing valve application where, for example, two charges of one liquid (from a double ported member) are mixed with a single charge (from a single ported member) before being withdraw from the chamber.

I claim:

1. In a fluid system of synchronizing intermittent fluid control with the motion of a part, a fluid casing defining a chamber provided with an aperture for intermittant fluid flow, a first shaft and a second shaft mounted for rotation with respect to said casing, members attached to said shafts and fixedly mounted in said chamber for rotation about substantially parallel axes, each member having a port, a timing belt entrained over said members to phase said members, said belt forming a valve member for said ports to alternately open and close said ports in response to rotation of said members, one of said shafts constituting a power driver for said part, said first shaft having a passage connected to one port and adapted to connect with a external fluid source so that said chamber is exposed to the fluid source when the last-mentioned port is open, at which time the other port is closed by said belt, and passageway means leading to the exterior of said casing and communicating with said other port.

2. The system of claim 1 and means to adjust the phasing of port opening and closing with respect to the angular position of said first shaft.

3. The system of claim 2 wherein said adjusting means include means to move said casing about the axis of said first shaft.

4. The system of claim 1 and, at least one intermediate ported rotary member engaged by said belt, a shaft supporting said intermediate member, and a passageway in said last-mentioned shaft and communicating with the port of the last-mentioned member.

References Cited in the file of this patent

UNITED STATES PATENTS

| | | |
|---|---|---|
| 601,634 | Cotter | Apr. 5, 1898 |
| 774,926 | Wells | Nov. 15, 1904 |
| 855,215 | Allendorfer | May 28, 1907 |
| 1,140,278 | Murry | May 18, 1915 |
| 1,896,092 | Mangiameli | Feb. 7, 1933 |
| 2,183,024 | Large | Dec. 12, 1939 |
| 2,905,462 | Christensen | Sept. 22, 1959 |